Oct. 19, 1948.        A. FROSCH        2,451,819
INDUCTION MAGNETOMETER
Filed April 12, 1944

INVENTOR.
Alex Frosch
BY
J. D. McKean
ATTORNEY.

Patented Oct. 19, 1948

2,451,819

UNITED STATES PATENT OFFICE 2,451,819

INDUCTION MAGNETOMETER

Alex Frosch, Houston, Tex., assignor to Standard Oil Development Company, a corporation of Delaware Application April 12, 1944, Serial No. 530,623

4 Claims. (Cl. 175—183)

This is a continuation in part of Serial No. 400,443, filed June 30, 1941, now abandoned.

The present invention is directed to a magnetometer. It is an object of the present invention to produce a magnetometer based on the principle of mutual induction. More specifically, the present case is directed to a magnetometer in which a conductive element constructed of a single turn of wire or ring of metal or as a unitary plate is arranged for uniformly recurring motion and is mounted adjacent a pickup coil.

An additional object of the present invention is a magnetometer including a movable conducting element arranged adjacent a pickup coil with driving means arranged for giving the element recurring motion through a relatively small angle at a relatively high frequency. Other objects and advantages of the present invention may be seen from a reading of the following description taken in conjunction with the drawing, in which Fig. 1 is a side view, partly in section, of an embodiment adapted for measuring the intensity of vertical components of the earth's magnetic field with parts cut away to show the driving means employed for a movable element;

Figure 1:
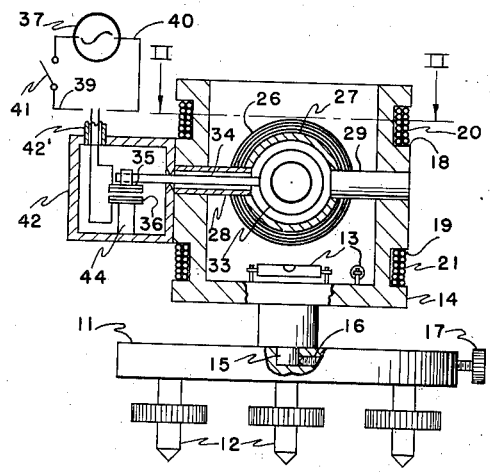
Figure 2:
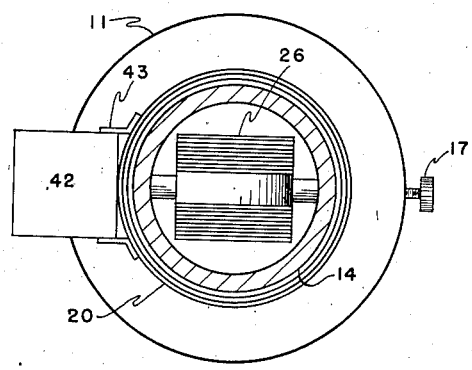
Fig. 2 is a view taken along line II—II of Fig. 1.

Referring specifically to the drawing, and first to Figs. 1 and 2, a base 11 is provided with leveling screws 12 and level bulbs 13 so that an operator may level it with respect to the surface of the earth. Frame 14 is provided at its lower end with pintle 15 fitting in a mating cavity in base 11 for rotation about a vertical axis. Screw 16, provided with knob 17, is arranged in base 11 with its end adjacent pintle 15 to allow an operator to lock frame 14 in position with respect to base 11.

Frame 14 is preferably in the form of a vertically arranged cylinder with the lower end closed to provide a suitable means for attaching pintle 15 and is provided with a circumferentially extending groove at its upper end and a similar groove at its lower end. The upper groove provides a suitable mounting means for coil 20 and similarly the lower groove provides a suitable mounting means for coil 21. Coils 20 and 21 are electrically connected in series aiding and are arranged in a circuit including a source of direct current 22, a variable resistor 23, switch 24 and means for indicating the amount of direct current flowing through the circuit, which means may be a direct current ammeter, or, as shown in the drawing, potentiometer 25, connected to measure the voltage cross resistance 10. Coils 20 and 21 servie as Helmholtz coils in the instrument and will be so designated hereafter in the specification.

Supported within frame 14 by suitable means is coil 26. The supporting means shown in the drawing includes a cylindrical member 27 with its axis horizontal, upon which coil 26 is wound. Cylindrical member 27 is attached to the frame by brackets 28 and 29. Coil 26 is arranged in an electrical circuit including amplifier 30, rectifier 31, and an instrument 32 for indicating the value of the direct current flowing through the circuit. Instrument 32 may a conventional microammeter, or, if desired, rectifier 31 and meter 32 may be replaced by earphones or a cathode ray oscilloscope or any conventional means for indicating alternating current.

Within coil 26 is arranged element 33, constructed of a conducting material and in the form of a closed electrical circuit. It is preferred to construct element 33 of metal in the shape of a ring, and such a construction is illustrated in the drawing. However, if desired, a disk formed of a conducting material may be substituted for the ring, inasmuch as little current is induced in the center portion of a disk when the disk is moved rapidly in a magnetic field and thus a disk is equivalent to a ring for this purpose. Optionally element 33 may be constructed as a coil having a number of turns, with the ends of the conductor fastened together, but this is not a preferred form of construction because the resistance of such an embodiment decreases the efficiency of the magnetometer.

Element 33 is arranged to be driven through a relatively small angle at a relatively rapid rate by driving means including rod 34, condenser plates 35 and 36, and a source of alternating potential 37, which is connected to the condenser plates by electrical conductors 39 and 40. A switch 41 is provided in conductor 39 to allow the circuit to be completed or broken at will by the operator. In order to prevent the driving means of the device from interfering with the indicating part of the circuit, it is desirable to enclose the condenser plates and the leads 39 with an electrostatic shield which is indicated by numerals 42 and 42' in the drawing. Shield 42' may conveniently be a metal sheath surrounding a cable containing insulated conductors 39 and 40. Condenser plate 36 is fixed in position by attaching it to shield 42 by a non-conducting bracket 44.

Figure 5:
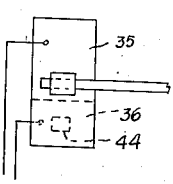
Fig. 5 is a fragmentary view of the driving means employed in the embodiments of Figs. 1 to 4, inclusive.

Element 33 is secured to one end of rod 34 with its plane parallel with the axis of the rod, and also when at rest or in midposition in its path of motion with its plane perpendicular with the surface of the earth. Rod 34 is secured at its midpoint to the wall of shield 42. To the end of rod 34 within shield 42 is secured condenser plate 35, with its plane parallel with the axis of rod 34 and with one end adjacent to fixed condenser plate 36. A plan view of condenser plates 35 and 36 is shown in Fig. 5; it will be seen from this figure that when alternating potential is applied to these condenser plates, rod 34 is given a torsional movement. When switch 41 is closed the alternating potential from source 34 is applied to the condenser plates and causes a pulsating movement of plate 35, which in turn causes a torsional movement of the end of rod 34 to which plate 35 is attached and this torsional effort is transmitted through rod 34 and results in the pulsation of element 33 at the other end of the rod. Rod 34 should be non-magnetic and have stable elastic properties; it is conveniently constructed of quartz or phosphor bronze. The fundamental frequency of the moving system including element 33, rod 34 and condenser plate 35 may be adjusted by altering the length and the diameter of rod 34. The sizes and weights of element 33 and condenser plate 35 are proportioned according to the size of rod 34. By the proper adjustment of the driving means the rod 34 is driven in resonance to cause a relatively large amplitude of motion to be given by a relatively small driving force. It is desirable to apply a potential to condenser plates 35, 36, which has a frequency one-half the fundamental frequency of the rod in the type of torsional vibration the rod performs. The shield 42 is employed to prevent the detecting means of the magnetometer, including coil 26 and units 30, 31 and 32, from picking up and indicating the alternating potential supplied to the driving means.

The device of the present invention is usually employed to determine the value of the vertical component of the earth's magnetic field. In making a magnetic survey of an area, it is customary to establish a number of stations spaced over the area being surveyed and to plot the result obtained at each station on a map of the area. When using the embodiment shown in Figs. 1 to 3, it is usually set up at a station and base 11 leveled by means of screws 12. Element 33 is then set in motion by source of alternating potential 37, which may be done by the closing of switch 41. Thereupon switch 24 may be closed to allow current to flow through Helmholtz coils 20 and 21 and the amount of this current is adjusted by the operator by altering the value of resistance 23 in the circuit until indicating means 32 gives a null reading. If indicating means 32 is a microammeter, a current is indicated when element 33 was first put in motion, and the null condition will be indicated when the reading is reduced to its smallest value or zero. If the indicating means is an earphone a hum will be heard in the phone when element 33 is first put in motion, and the hum will have its least magnitude or may disappear when the null condition has been obtained. When the null reading is indicated, the vertical component of the earth's magnetic field has been equalized by the magnetic component produced by the current flowing through Helmholtz coils 20, 21, and this amount of current is recorded. The current required to equalize the vertical component of the earth's magnetic field or a function thereof may be plotted as the reading of the station when conducting a magnetic survey.

It may be pointed out that usually element 33 oscillates through such a small angle that it is unnecessary to orient frame 14. However, if element 33 oscillates through a substantial angle or if it is desirable to make a very accurate survey, then at each station frame 14 may be oriented by loosening screw 16 and moving frame 14 about a vertical axis to a given direction, for example with the axis of cylinder 27 lying on a north-south line, the frame locked in position by screw 16, element 33 set in motion and a reading then obtained of the amount of current which must be passed through Helmholtz coils 20, 21 in order to produce a null condition.

Figure 4:
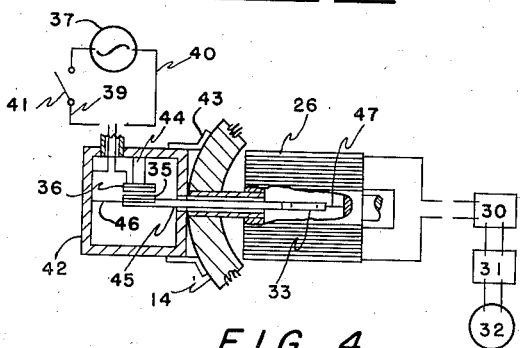
Fig. 4 is a fragmentary view showing an alternative driving means which may be substituted for the driving means of the embodiment of Figs. 1 and 2.

Another embodiment of a driving means for element 33 is shown in Fig. 4. In this embodiment element 33 is rigidly secured to condenser plate 35 by member 45. Member 45 is preferably selected to have substantial stiffness, so that the assembly including members 33, 35 and 45 will move as a single unit. This assembly is suspended by wire 46 securing condenser plate 35 to shield 42 and wire 47 securing member 33 to a bracket attached to cylinder 27. This embodiment is driven similarly to the embodiment shown in Figs. 1 and 2 and includes condenser plate 36 attached to shield 42 by non-conducting bracket 44, and a source of alternating potential 37 connected to plate 36 by conductor 40 and plate 35 by conductor 39, containing switch 41.

Figure 3:
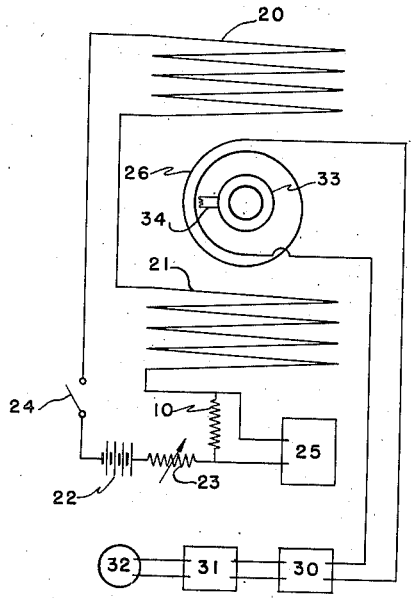
Fig. 3 is a wiring diagram showing the electrical components of the circuit including coils 20, 21 and 26 of Fig. 1.

It will be apparent that the driving means of Fig. 4 may be substituted for the driving means shown in the embodiment of Figs. 1 and 2, and that the device as provided with the substituted driving means will be operated in the same manner and obtains equivalent results. When the driving means of Fig. 4 is substituted as described, the receiving and indicating means will not require alteration, so the circuit diagram of Fig. 3 is applicable to each embodiment.

It will be understood that the sizes and proportions of the component parts used in the device of the present invention may be varied over a substantial range and that satisfactory results may be obtained over this range. By way of example, it may be stated that satisfactory results have been obtained when the driving means shown in Figs. 1 and 2 was constructed of a rod 1.0 cm. in diameter and 10 cm. long and having secured to one end a movable element 3 cm. in diameter. The driving means drove the rod in resonance at a frequency of the order of 10,000 cycles per second, giving the outside edges of element 23 an amplitude of motion in the order of $\frac{1}{1000}$ of an inch and produced signals of satisfactory magnitude. It will be understood that the above examples are given by way of illustration and not by way of limitation, and that the dimensions and frequencies may be varied over a wide range as desired.

Having fully described and illustrated a preferred embodiment of the present invention, what I desire to claim is:

1. A magnetometer comprising, in combination, a coil arranged in a circuit including a potential indicating device, a relatively flat non-magnetic high conductivity element, a mounting means securing the coil in fixed position, non-magnetic means of stable elastic properties securing the high conductivity element to the mounting means for angular movement about a fixed axis and a driving means arranged to vibrate the element and move its plane through a small angle with respect to the axis of the coil at a relatively rapid rate, said high conductivity element being mounted in the electromagnetic field of said coil and with its plane, when at rest, substantially perpendicular to the axis thereof and adapted to vary the current induced in the coil when the element is in motion.

2. In a magnetometer, a coil arranged in a circuit including a potential indicating device, a mounting means securing the coil in a fixed position, a relatively flat non-magnetic high conductivity element, non-magnetic suspending means with stable elastic properties securing the element to the mounting means for angular movement about a fixed axis, said high conductivity element being mounted in the electromagnetic field of said coil and with its plane, when at rest, substantially perpendicular to the axis thereof and adapted to vary the current induced in the coil when the element is in motion, a driving means arranged to cause movement of the plane of the element through a small angle with respect to the axis of the coil and including a condenser plate secured to the mounting means, a condenser plate adjacent thereto and secured to the suspending means, and a source of alternating potential electrically connected to the condenser plates.

3. A device in accordance with claim 2 in which the suspending means is a rod secured to the mounting means at approximately its midpoint and the element is secured to one end thereof and the first condenser plate to the other end thereof.

4. A device in accordance with claim 2 in which the suspending means includes a rigid member connecting the first condenser plate and the element and wires extending from the first condenser plate to the mounting means and from the element to the mounting means.

ALEX FROSCH.

REFERENCES CITED

The following references are of record in the file of this patent:

UNITED STATES PATENTS

| Number | Name | Date |
|---|---|---|
| 540,969 | Field | June 11, 1895 |
| 1,644,789 | Nordenswan et al. | Oct. 11, 1927 |
| 1,665,662 | Godkin | Apr. 10, 1928 |
| 1,954,075 | Zuschlag | Apr. 17, 1934 |
| 2,103,224 | Schweitzer et al. | Dec. 21, 1937 |
| 2,151,627 | Vacquier | Mar. 21, 1939 |
| 2,334,593 | Wyckoff | Nov. 16, 1943 |